Sept. 16, 1969 ATUTOSI OKAMOTO ET AL 3,467,443
ANTISKID APPARATUS FOR AUTOMOTIVE VEHICLES
Filed Nov. 22, 1967 3 Sheets-Sheet 1

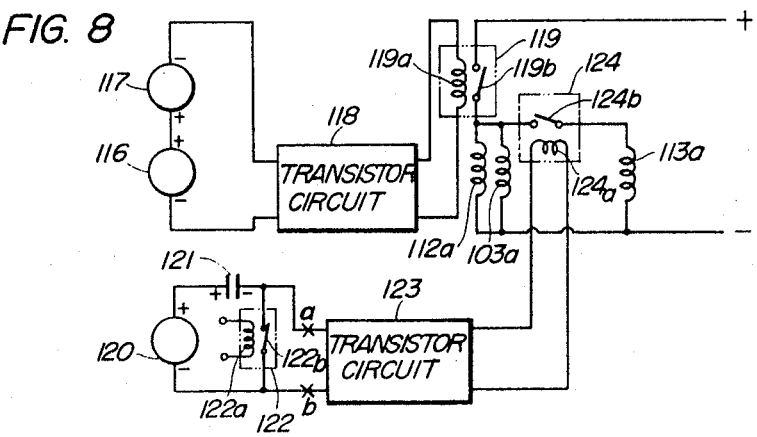
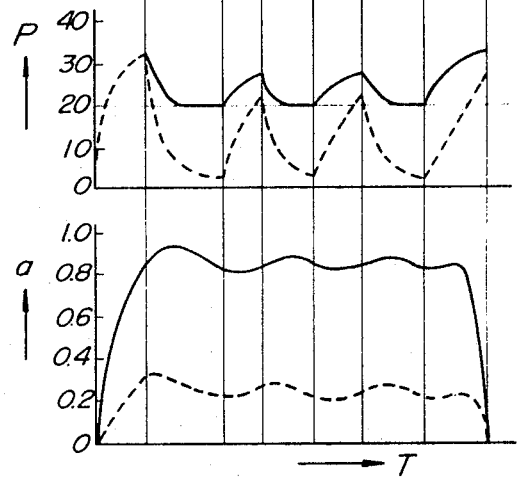

3,467,443
ANTISKID APPARATUS FOR AUTOMOTIVE
VEHICLES
Atutosi Okamoto, Toyohashi-shi, Koichi Taniguchi, Kariya-shi, and Yoshiaki Nakano, Gifu-shi, Japan, assignors to Nippon Denso Company Limited, Kariya-shi, Japan, a corporation of Japan
Filed Nov. 22, 1967, Ser. No. 685,118
Claims priority, application Japan, Aug. 17, 1967, 42/53,041; Aug. 21, 1967, 42/53,626; Aug. 31, 1967, 42/56,006
Int. Cl. B60t 8/02, 15/02, 8/12
U.S. Cl. 303—21                                 2 Claims

ABSTRACT OF THE DISCLOSURE

An antiskid apparatus for an automotive vehicle having a device for detecting the speed of the vehicle body and a device for detecting the slip ratio of the wheel. The apparatus having such devices acts to prevent a loss of steerability or a gyrating movement of the vehicle body due to the locked state of the wheel resulting from the impartation of a brake force to the vehicle when the vehicle is running on a slippery road surface or running at high speed.

BACKGROUND OF THE INVENTION

Field of the invention

This invention relates to an antiskid apparatus for an automotive vehicle, which is especially useful to prevent a gyrating movement of the vehicle body or a loss of the steerability of the vehicle due to the locked state of the wheels resulting from the impartation of a brake force to the automotive vehicle which is running on a slippery road surface or running at a high speed.

Description of the prior art

Antiskid apparatus heretofore known in the art were so designed as to detect the deceleration or acceleration of the wheels of an automotive vehicle to thereby impart a brake force to the automotive vehicle or release a brake force having been imparted to the vehicle. However, as is commonly known, the deceleration of the vehicle body becomes maximum when the slip ratio $\sigma$, which is determined by the speed SB of the vehicle body and the speed SH of the wheel at the time of brake force impartation and is given by the equation $$\sigma = \frac{SB - SH}{SB} \times 100$$

lies within a range between 15% and 20%

The prior art antiskid apparatus described above which was designed to control the hydraulic pressure in the brake system independently of the slip ratio $\sigma$ unavoidably involved such a defect that a long braking distance was required to stop the vehicle, or the wheels were liable to be locked when the brake was imparted to the vehicle running on a slippery road surface such as a frozen road surface. In order to eliminate the above defect, an antiskid apparatus which can exactly control the hydraulic pressure in the brake system depending on the slip ratio $\sigma$ must be developed. In this respect, for the successful development of such an antiskid apparatus, a vehicle body speed detecting device for successfully detecting the slip ratio $\sigma$ is inevitably required. Since, however, an antiskid apparatus is functionally requested to exactly detect the speed of the vehicle body in the braked state of a vehicle, an attempt to merely connect an electric generator to the wheel of the vehicle to thereby detect the speed of the vehicle body on the basis of a voltage generated by the electric generator has been attended with the unacceptable result that the speed of the vehicle body so detected is utterly unsatisfactory because of the fact that a slip takes place on the wheels in such a braked state of the vehicle. The above defect may be remedied by affixing to the vehicle body an extra wheel which is independent of the brake system and does not therefore contribute to the drive of the vehicle, and by connecting an electric generator to this wheel for thereby exactly detecting the speed of the vehicle body in the braked state. The provision of such an extra wheel, however, is defective and unpractical in view of the fact that the structure of the vehicle body must be varied and the device as a whole becomes quite expenisve.

Further, the prior art antiskid apparatus in which the hydraulic pressure was controlled independently of the slip ratio $\sigma$ was not so designed as to detect the speed of the vehicle body per se. Therefore, the prior art antiskid apparatus has been defective in that the hydraulic pressure in the brake system tends to be reduced to such an extent that the speed of the vehicle body equals the speed of the wheel with the result that the deceleration of the vehicle body is momentarily reduced to zero, and at the next moment, the hydraulic pressure in the brake system is increased to such an extent that a large deceleration in the order of 1g (g being the acceleration of gravity) is imparted to the vehicle body, the above situation being repeated to give a very uncomfortable feeling of ride during the impartation of the brake force to the vehicle.

Moreover, the prior art antiskid apparatus was operative to detect the deceleration and acceleration of the wheels to thereby merely effect the on-off control of the brake force. For example, the prior art antiskid apparatus was so designed that, when the wheels were braked to run with a deceleration less than a predetermined setting due to the impartation of a brake force to the vehicle, the apparatus was actuated to relieve the brake force to thereby allow the wheels to run at an increased speed, and when the acceleration exceeded a predetermined setting, the apparatus was operative to impart a brake force to the vehicle again. However, the prior art apparatus of the kind which was adapted to merely effect the on-off control of the brake force in two stages, that is, a stage of a high brake force and a stage of a low brake force, has given rise to an objectionable problem that the brake force is relieved more than is required on a hardly slippery road surface, and as a result, excessive and quickly repeated fluctuation takes place in the rotation of the wheels so that the speed of responses of the antiskid action is so low as to properly follow up the variation in the speed of the wheels. In view of the above situation, an attempt to provide a brake force control means which can properly follow up the rate of variation in the speed of the wheels has resulted in the requirement for the provision of a power source which can deliver a power as high as several horsepowers. Thus, the attainment of such a high speed response as described above has been utterly impracticable with a brake force control means of the vacuum type utilizing the negative pressure of the engine or with a brake force control means of the electrically driven type employing an electric motor which is adapted to receive its drive power from the battery mounted on the vehicle.

The brake force control means of the vacuum type or of the electrically driven type, when adapted to operate by detecting the deceleration or acceleration of the wheels, has also been defective in that the speed of response of the antiskid action is so low as to properly follow up the rate of variation in the speed of the wheels when the vehicle is running on a hardly slippery road surface, and the deceleration of the vehicle body during the braking operation varies usually very much between 0 to 1 g (g being the acceleration of gravity) at a period in the order of 2 cycles per second, with the result that a long braking distance is required to stop the vehicle and a very uncomfortable feeling of ride is unavoidable during the impartation of the brake force to the vehicle. Moreover, when the vehicle runs on a slippery road surface such as a frozen road surface, there has frequently been a danger such that the vehicle skids over the frozen road surface with its wheels kept in their locked state because the wheels may prematurely be urged to their locked state depending on the degree of actuation of the brake pedal without the speed of the wheels being reduced to a value less than a predetermined setting, and the brake force thus imparted is not released at all once the wheels have been locked in the above manner.

SUMMARY OF THE INVENTION

With a view to eliminate the prior defects described above, it is the primary object of the present invention to provide a novel antiskid apparatus for an automotive vehicle which can satisfactorily attain the desired antiskid operation on a slippery road surface in spite of the fact that it is simple in structure and can be manufactured at a low cost.

Another object of the present invention is to provide a highly practical and inexpensive antiskid apparatus for an automotive vehicle which can exactly detect the speed of the vehicle body in the braked state of the vehicle. In order to attain the above object, the present invention contemplates the provision of an antiskid apparatus for an automotive vehicle which includes therein a vehicle body speed detecting device comprising a vehicle body deceleration detector which may be a conventional acceleration detector utilizing the inertia of a weight, a first condenser connected to the output side of said vehicle body deceleration detector in such a relation that it is switched over from a parallel connection to a series connection with said vehicle body deceleration detector in response to the operation of a first set of relay contacts which is actuated in an interlocked relation with the actuation of the brake pedal, an integrator formed by the combination of a second condenser and an active element whose output current is dependent solely on an input current or input voltage and is quite independent of an output voltage, an impedance transformer for controlling the input to said integrator supplied from said vehicle body deceleration detector through said first condenser, a speed responsive generator for charging said second condenser in said integrator with a voltage representing the speed of the wheel developed immediately before the impartation of a brake force to the vehicle, and a second set of relay contacts which is also operative in an interlocked relation with the actuation of the brake pedal so as to disconnect said second condenser from said speed responsive generator in response to the starting of the brake action by the actuation of the brake pedal, whereby the speed of the wheel developed immediately before the impartation of the brake action can be stored in said second condenser as the speed of the vehicle body.

A further object of the present invention is to provide a satisfactorily operable antiskid apparatus for an automotive vehicle which is operative to control the hydraulic pressure in the brake system in the vehicle by detecting the wheel slip ratio $\sigma$, for thereby shortening the braking distance to stop the vehicle, preventing a locked state from taking place on the wheel, and improving the feeling of ride at the time of the impartation of the brake action. In order to attain the above object, the present invention contemplates the provision of an antiskid apparatus for an automotive vehicle which includes therein a wheel slip ratio detecting device comprising a relay having a set of relay contacts which is operable in an interlocked relation with the actuation of the brake pedal, means for deriving a voltage $V_C$ which is $\beta$ times a voltage $V_B$ representing the speed of the vehicle body, means for deriving a voltage $V_G$ representing the speed of the wheel, means operative in response to the actuation of said relay contacts due to the impartation of a brake force to the vehicle to thereby connect said means for deriving the voltage $V_G$ in series with said means for deriving the voltage $V_C$ in a polarity opposite to the polarity of the latter, definite voltage level detecting means connected across the output terminals of the circuit including both said voltage deriving means for detecting the magnitude of the difference between the voltage $V_C$ and the voltage $V_G$, and means connected with said definite voltage level detecting means so as to control the hydraulic pressure in the brake system depending on the output of said definite voltage level detecting means.

Another object of the present invention is to provide an anti-skid apparatus for an automotive vehicle which is operative to positively prevent the wheels from being continuously locked when the vehicle runs on a slippery road surface and to maintain a substantially constant deceleration of the vehicle body when a brake force is imparted to the vehicle running on a hardly slippery road surface, for thereby shortening the braking distance to stop the vehicle and giving a comfortable feeling of ride during the impartation of the brake force to the vehicle. In order to attain the above object, the present invention contemplates the provision of an antiskid apparatus which comprises means for controlling the brake force in three different stages, that is, a high brake force stage, a medium brake force stage and a low brake force stage, means for deriving a voltage $V_G$ representing the speed of the wheel, means for deriving a voltage $V_C$ representing such a speed of the vehicle body which is $\beta$ times a voltage $V_B$ representing the actual speed of the vehicle body, where $0<\beta<1$, and means for sensing a deceleration of the vehicle body, said brake force control means being operative in such a way that a transition from the high brake force stage to the medium brake force stage takes place when the deceleration of the vehicle body exceeds a predetermined setting and the voltage $V_G$ is lower than the voltage $V_C$, and a transition from the medium brake force stage to the high brake force stage takes place when the deceleration of the vehicle body exceeds the predetermined setting and the voltage $V_G$ is higher than the voltage $V_C$, while a transition from the high brake force stage to the low brake force stage takes place when the deceleration of the vehicle body is less than the predetermined setting value and the voltage $V_G$ is lower than the voltage $V_C$, and a transition from the low brake force stage to the high brake force stage takes place when the deceleration of the vehicle body is less than the predetermined setting value and the voltage $V_G$ is higher than the voltage $V_C$.

BRIEF DESCRIPTION OF THE DRAWINGS

In the drawings:

FIG. 8 is an electrical connection diagram of a electrical control section in the brake force control device shown in FIG. 7; and FIGS. 9A, 9B and 9C are graphic representations for the explanation of the antiskid operation by the antiskid apparatus according to the present invention, wherein FIG. 9A shows the relation between the speed responsive voltage and braking time, FIG. 9B shows the relation between the hydraulic pressure in the wheel cylinder and the braking time, and FIG. 9C shows the relation between the deceleration of the vehicle body and the braking time.

DESCRIPTION OF THE PREFERRED EMBODIMENTS

Figure 1:
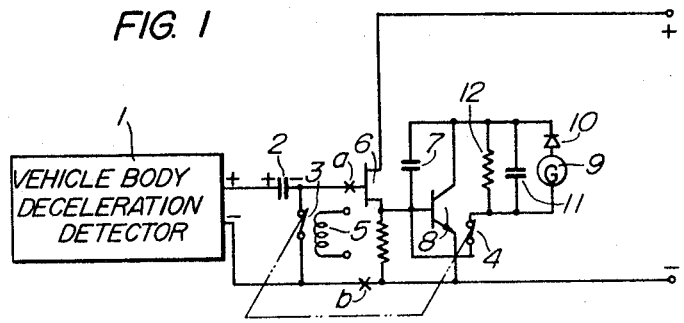
FIG. 1 is an electrical connection diagram showing the structure of an embodiment of the antiskid apparatus according to the present invention equipped with a vehicle body speed detecting device.

Referring to FIG. 1, there is shown the circuitry of a device for detecting the speed of the vehicle body which forms a part of the antiskid apparatus according to the present invention. The vehicle body speed detecting device comprises a vehicle body deceleration detector 1 which may, for example, be a differential transformer of the structure having a ferrite core whose position is variable depending on the movement of an associated mass. The deceleration detector 1 is mounted on the body of an automotive vehicle. The deceleration detector 1 is connected to a condenser 2 and a set of normally closed relay contacts 3. The normally closed relay contacts 3 in conjunction with another set of normally closed relay contacts 4 of the same relay are urged to open in response to the energization of a relay coil 5 which is controlled by a brake switch (not shown) in such a way that a current is supplied to the relay coil 5 when the brake pedal is actuated and the current supply thereto is interrupted when the brake pedal is released to its non-actuated state. A transistor 6 is disposed in the circuit to serve as an impedance transformer and has a high input impedance but a low output impedance. The transistor 6 may, for example, be a field effect transistor. The above-described high input impedance of the transistor 6 is required in order to prevent the charge stored in the condenser 2 from discharging at least during the braking operation. A condenser 7 constitutes an integrator together with another transistor 8 and serves as a memory means to store therein the speed of the vehicle body developed immediately before a brake force is imparted to the vehicle. A speed responsive generator 9 is operatively connected with one of the wheels in order to detect the speed of the wheel. The normally closed relay contacts 4 described previously are interposed between the condenser 7 and the speed responsive generator 9 in order to establish a connection or interrupt the connection therebetween. A diode 10 is connected with the speed responsive generator 9 for the rectification of A.C. output from the speed responsive generator 9. A condenser 11 and a resistance 12 constitute a smoothing circuit for smoothing out the D.C. output delivered from the diode 10.

The vehicle body speed detecting device having a structure as described above operates in the manner described below. When the brake pedal is not actuated, a voltage induced in the vehicle body deceleration detector 1 is rectified and applied in its rectified form across the condenser 2 to charge the same since no current is supplied to the relay coil 5 and hence the relay contacts 3 are in a closed state. In this connection, it will be understood that zero voltage is applied across the input terminals $a$ and $b$ of the transistor 6 when the vehicle runs at a constant speed on a nonsloped flat road surface. On the other hand, a voltage corresponding to the speed of the wheel is charged across the condenser 7 by the speed responsive generator 9. The voltage appearing across the condenser 7 corresponds with the speed of the vehicle body under a state in which a brake force is imparted to the vehicle, since in such a state no slip takes place on the wheels and the speed of the wheel is substantially equal to the speed of the vehicle body.

Figure 2:
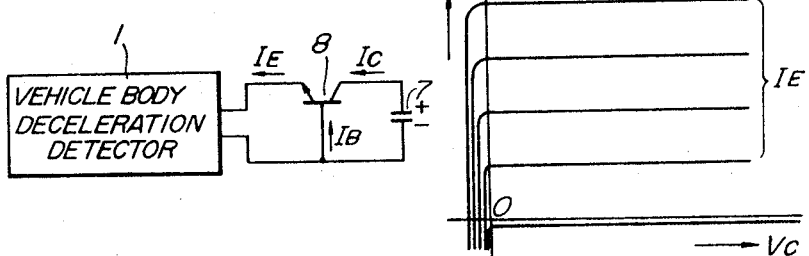
FIG. 2 is a simplified diagram of a part of the diagram shown in FIG. 1.
Figure 3:
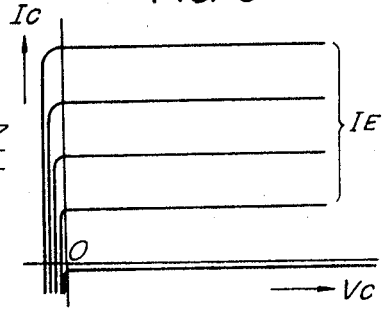
FIG. 3 is a graphic representation of the voltage-current characteristic of the output of a transistor of a grounded-base configuration shown in FIGS. 1 and 2.

Then when the brake pedal is actuated, the relay contacts 3 and 4 are urged to open, and as a result of the opening of the relay contacts 3, the condenser 2 is connected in series with the vehicle body deceleration detector 1 in a polarity opposite to the polarity of the latter. Therefore, the moment the brake pedal is actuated, the voltage appearing across the input terminals $a$ and $b$ of the transistor 6 shown in FIG. 1 necessarily becomes zero. Accordingly, once the brake pedal is actuated to impart a brake force to the vehicle running on a sloped road, such output of the vehicle body deceleration detector 1 which is generated by the effect of the gravity imparted by the earth is rendered independent of any brake action that may be subsequently imparted to the vehicle. A deceleration developed in the vehicle body results in an application of a voltage across the input terminals $a$ and $b$ of the transistor 6 through the condenser 2, which voltage is dependent upon the deceleration of the vehicle body. This voltage supplies a base current to the transistor 8 through the transistor 6 so that the transistor 8 is urged to its conducting state. The transistor 8 is of a grounded-base configuration as shown in FIG. 2 and is so arranged that the input side thereof is connected to the vehicle body deceleration detector 1 while the output side thereof is connected to the condenser 7. Accordingly, the emitter current $I_E$ flowing into the transistor 8 is proportional to the deceleration of the vehicle body, while the collector current $I_C$ and the base current $I_B$ of the transistor are represented by $I_C = \alpha I_E$ and $I_B = (1-\alpha) I_E$, respectively. Here the symbol $\alpha$ designates the current amplification factor employed in the transistor theory, and is a constant having an average value in the order of 0.99 which is substantially independent of the transistor characteristics, emitter current $I_E$, ambient temperature, etc. In FIG. 3 there is shown the voltage-current characteristic of the output of the transistor 8. From FIG. 3 it will be seen that the collector current $I_C$ of the transistor 8 is only proportional to the emitter current $I_E$ and is independent of the collector voltage, that is, a voltage $V_C$ appearing across the condenser 7.

Suppose now that Q is the charge stored in the condenser 7, C is the electrostatic capacity of the condenser 7 which is constant, and $V_C$ is the voltage appearing across the condenser 7. Then, there is a relation, $Q = CV$, from which an equation $$\frac{dQ}{dt} = C \frac{dV_C}{dt}$$

can be derived. Therefore, from the relation $$I_C = \alpha I_E = -\frac{dQ}{dt} = -C \frac{dV_C}{dt}$$

a relation, $$V_C = -\frac{\alpha}{C} \int I_E dt$$

can be derived. Suppose that the speed of the vehicle body is equal to the the speed wheel immediately before the brake action is imparted to the vehicle and the voltage representing the above speed is designated by $V_0$. Then, since the emitter current $I_E$ is proportional to the deceleration of the vehicle body, a relation.

$$V_C = V_0 - \frac{\alpha}{C} \int I_E dt$$

can be obtained which shows that the collector voltage $V_C$ represents the speed of the vehicle body in the braked state of the vehicle. More precisely, the speed component obtained by integrating the deceleration of the vehicle body with time $t$ is subtracted from the voltage $V_0$ represting the speed of the vehicle body immediately before the impartation of the brake action, and as a result, the $$V_C = V_0 - \frac{\alpha}{C}\int I_E dt$$

representing the speed of the vehicle body in the braked state appears across the condenser 7.

It will be appreciated from the foregoing description that the antiskid apparatus according to the present invention can exactly detect the speed of the vehicle body in a braked state of the vehicle independently of any slip taking place on the wheels and without being affected by the gravity imparted by the earth even when the vehicle is running on a sloped road, by virtue of the fact that the antiskid apparatus includes therein a vehicle body speed detecting device which comprises a vehicle body deceleration detector 1, a condenser 2 connected in series with the output side of the vehicle body deceleration detector 1, an integrator formed by the combination of another condenser 7 and an active element whose output current is dependent solely on an input current or input voltage and is quite independent of an output voltage, an impedance transformer 6 for controlling the input to the integrator supplied from the vehicle body deceleration detector 1 through the condenser 2, a speed responsive generator 9 for charging the condenser 7 in the integrator with a voltage representing the speed of the wheel developed immediately before the impartation of a brake force to the vehicle, and a second set of relay contacts 4 which is also operative in an interlocked relation with the actuation of the brake pedal so as to disconnect the condenser 7 from the speed responsive generator 9 in response to the starting of the brake action by the actuation of the brake pedal, whereby the speed of the wheel developed immediately before the impartation of the brake action can be stored in the condenser 7 as the speed of the vehicle body. Moreover, since the integrator in the invention has a very simple structure as it consists of only two elements, that is, the active element which, in the present embodiment, is a transistor 8 of a grounded-base configuration and the condenser 7, the integrator is remarkably inexpensive compared with prior integrators of complex structure and gives a high reliability because of the small number of components. Further, the apparatus as a whole can be made to a remarkably small size compared with the proir device which is provided with an extra wheel which is mounted independently of the brake system for the detection of the speed of the vehicle body. Moreover, the apparatus can be manufactured at a low cost because there is utterly no necessity to change the structure of the vehicle body.

Figure 4:
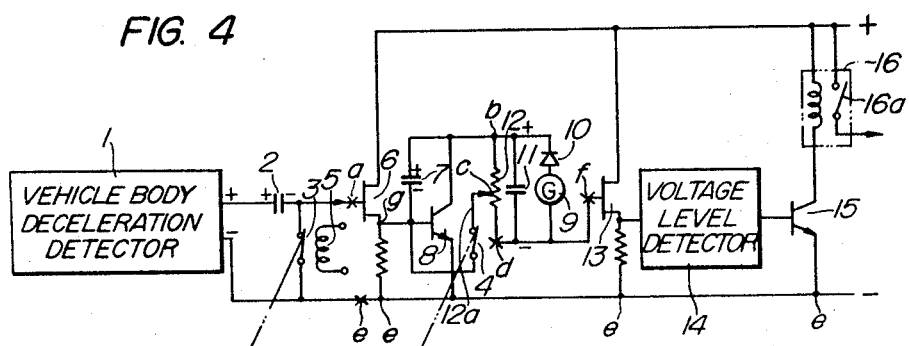
FIG. 4 is an electrical connection diagram showing the structure of another embodiment of the antiskid apparatus according to the present invention equipped with a wheel slip ratio detecting device.
Figure 5A:
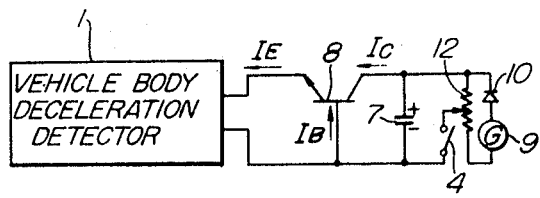
FIG. 5A is an electrical connection diagram showing the detail of a part of the diagram shown in FIG. 4.
Figure 5B:
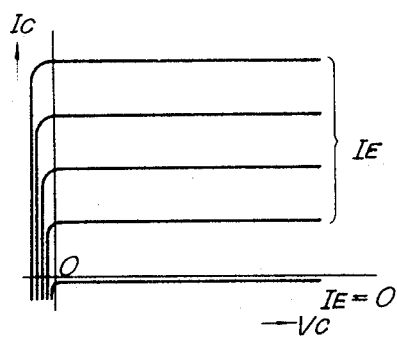
FIG. 5B is a graphic representation of the voltage-current characteristic of the output of a transistor of a grounded-base configuration shown in FIG. 5A.
Figure 6:
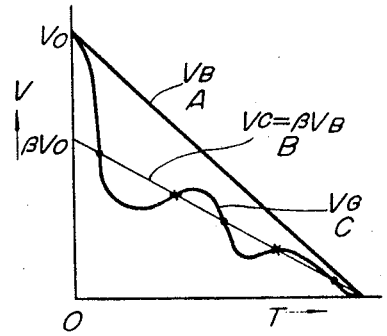
FIG. 6 is a graphic illustration of the manner of operation of the antiskid apparatus shown in FIG. 4.

Another embodiment of the present invention will be described with reference to FIGS. 4 to 6. Referring to FIG. 4, the antiskid apparatus comprises a vehicle body deceleration detector 1 which is mounted on the body of an automotive vehicle and may, for example, be a differential transformer of the structure having a ferrite core bar whose position is variable depending on the movement of an associated weight. The deceleration detector 1 is connected to a condenser 2 and a set of normally closed relay contacts 3. The normally closed relay contacts 3 in conjunction with another of normally closed relay contacts 4 of the same relay are urged to open in response to the energization of a relay coil 5 which is controlled by a brake switch (not shown) in such a way that a current is supplied to the relay coil 5 when the brake pedal is actuated and the current supply thereto is interrupted when the brake pedal is released to its nonactuated state. A transistor 6 is disposed in the circuit to serve as an impedance transformer and has a high input impedance but a low output impedance. The transistor 6 may, for example, be a field effect transistor. The above-described high input impedance of the transistor 6 is required in order to prevent a variation of the charge stored in the condenser 2 from taking place during the braking operation. A condenser 7 disposed in the circuit acts as a memory means to store therein the speed of the wheel, hence, the speed of the vehicle body immediately before the impartation of the brake action, and at the same time, constitutes an integrator together with a transistor 8. The integrator operates in such a manner that the value $\int g dt$, which is obtained by integrating a deceleration $g$ of the vehicle body with the time $t$ developed during the braking operation is subtracted from the speed of the vehicle body stored in the in the condenser 7, that is, the speed of the vehicle body immediately before the impartation of the brake action, so that a voltage representing the speed of the vehicle body subjected to the brake action can appear across the condenser 7. A speed responsive generator 9 connected to one of the wheels detects the speed of the wheel and delivers an A.C. output, which is rectified by a diode 10 and is then smoothed out by a smoothing circuit composed of a variable resistor 12 and a condenser 11. The relay contacts 4 described previously are interposed between the condenser 7 and a movable arm 12a of the variable resistor 12 in order to establish a connection or interrupt the connection therebetween. A transistor 13 operative as an impedance transformer has a high input impedance. Between the transistor 13 and another transistor 15, there is disposed a definite voltage level detector 14 which may, for example, be a Schmitt circuit. The transistor 15 is operative to energize a relay 16 which acts to actuate a hydraulic pressure control device associated with the brake system. For example, the relay 16 operates in such a manner that the closure of its relay contacts 16a causes a reduction in the hydraulic pressure in the brake system and the opening of the contacts 16a causes an increase in the hydraulic pressure in the brake system.

The antiskid apparatus having a structure as described above operates in a manner as described below. When the brake pedal is not actuated, a voltage induced in the vehicle body deceleration detector 1 is rectified and applied in its rectified form across the condenser 2 to charge the same since no current is supplied to the relay coil 5 and hence the relay contacts 3 and 4 are in the closed state. Suppose now that $b$ and $d$ are the opposite terminals of the variable resistor 12, $c$ is the contact point of the movable arm 12a with the variable resistor 12, and $V_0$ is the voltage generated by the speed responsive generator 9 immediately before the impartation of the brake action, hence the voltage representing the speed of the wheel immediately before the impartation of the brake action. Then a voltage $\overline{bc}/\overline{bd} \cdot V_0 = \beta V_0$, which is $\beta$ times a voltage $V_B$ representing the speed of the vehicle body, is applied across the condenser 7 and is stored therein. More precisely, since the voltage $V_0$ representing the speed of the wheel is equal to the voltage $V_B$ representing the speed of the vehicle body at a time immediately before the impartation of the brake action to the vehicle, the voltage $V_B$ is necessarily equal to the voltage $V_0$ representing the speed of the wheel immediately before the impartation of the brake action, and thus the voltage which is $\beta$ times the voltage $V_B$ representing the speed of the vehicle body is applied across the condenser 7 and is stored therein. In the above formula, $\overline{bc}$ and $\overline{bd}$ represent the resistances between the points $b$ and $c$, and between the points $b$ and $d$, respectively, in the electrical connection diagram shown in FIG. 4, and naturally, the value of $\beta$ lies between a range, $0 < B < 1$.

Then when the brake pedal is actuated to impart a brake force to the running vehicle, the relay contacts 3 and 4 are urged to open, and as a result of the opening of the relay contacts 3, the condenser 2 is connected in series with the vehicle body deceleration detector 1 in a polarity opposite to the polarity of the latter. Therefore, the moment the brake pedal is actuated, the voltage appearing across the input terminals $a$ and $e$ of the transistor 6 becomes necessarily zero. When the vehicle body is decelerated due to the impartation of the brake force, a current representing the magnitude of the deceleration is supplied through the transistor 6 to flow across the base and the emitter of the transistor 8. Thus, the charge having been stored in the condenser 7 up to a time immediately before the impartation of the brake force is discharged across the collector and the emitter of the transistor 8, with the result that a voltage $V_C$ which is $\beta$ times the value of the voltage $V_B$ representing the actual speed of the vehicle body appears across the condenser 7.

The above situation will be discussed in more detail. Referring to FIG. 5A, the transistor 8 is in a grounded-base configuration. Accordingly, its output voltage-current characteristic is such that the output current $I_C$ is independent of the output voltage $V_C$ and is solely proportionally controlled by the input current $I_E$ as graphically shown in FIG. 5B. Then, from the relation $Q=CV_C$, where C is the electrostatic capacity of the condenser 7, an equation $$\frac{dQ}{dt}=C\frac{dV_C}{dt}$$

is derived, and hence the output current $I_C$ is expressed as $$I_C=C\frac{dV_C}{dt}$$

Further, since there is a relation $I_C=\alpha I_E$, where $\alpha$ is the current amplification factor of the transistor 8, the output voltage $V_C$ is expressed as $$V_C=-\frac{\alpha}{C}\int I_E dt$$

Moreover, due to the fact that the voltage stored in the condenser 7 is $\beta V_0$, the voltage $V_C$ actually appearing across the condenser 7 due to the impartation of the brake action is expressed as $$V_C=\beta V_0-\frac{\alpha}{C}\int I_E dt$$

It will thus be understood that the voltage $V_C$ actually appearing across the condenser 7 is $\beta$ times the voltage $V_B$ representing the actual speed of the vehicle body.

On the other hand, when the relay contacts 4 are urged to open by the actuation of the brake pedal, the condenser 7 is connected in series with the speed responsive generator 9 which detects the speed of the wheel. In such a case, an input voltage $V_{ef}$ which is expressed by $$V_{ef}=V_{eg}+V_C-V_G$$

is supplied to the transistor 13, where $V_G$ is the voltage representing the speed of the wheel and has a relation $V_G=V_0=V_B$ at a time immediately before the impartation of the brake action, and $V_{eg}$ is the emitter-to-base voltage of the transistor 8. Neglecting the voltage $V_{eg}$ which is generally small, a relation $V_{ef}=V_C-V_G'$ can be obtained, Therefore, by designing the definite voltage level detector 14 in such a way that the relay contacts 16a of the relay 16 are urged to close when $V_{ef}>0$ and are urged to open when $V_{ef}<0$, the relay contacts 16a are closed to reduce the hydraulic pressure in the brake system when $V_C>V_G$ and are opened to increase the hydraulic pressure in the brake system when $V_C<V_G$. Since the voltage $V_C$ appearing across the condenser 7 is $\beta$ times the voltage $V_B$ representing the actual speed of the vehicle body as described previously, the relay 16 operates in such a way as to close the relay contacts 16a in response to the relation $\beta V_B>V_G$ and to open the relay contacts 16a in response to the relation $\beta V_B<V_G$. In other words, the relay contacts 16a are closed when the voltage $V_G$ representing the speed of the wheel is less than $\beta$ times the voltage $V_B$ representing the speed of the vehicle body, while the relay contacts 16a are opened when the voltage $V_G$ is more than $\beta$ times the voltage $V_B$.

In the meantime, it will be recalled that the wheel slip ratio $\sigma$ is expressed as $$\sigma=\frac{SB-SH}{SB}$$

hence, $SB(1-\sigma)=SH$. Then, there is a relation $\beta=1-\sigma$ because the voltage $V_G$ representing the speed of the wheel is $\beta$ times the voltage $V_B$ representing the speed of the vehicle body at a point at which the relay coils 16a are either opened or closed. This means that the hydraulic pressure control device can be actuated under a fixed value of the wheel slip ratio $\sigma$, and saying in other words, the anti-skid apparatus of the present invention controls the hydraulic pressure in the brake system by detecting the wheel slip ratio $\sigma$.

The above operation will be described with reference to FIG. 6, in which the ordinate shows the speed responsive voltage V and the abscissa shows the braking time T. The curve A in FIG. 6 represents the voltage $V_B$ responsive to the speed of the vehicle body, which voltage $V_B$ does not actually appear in the electrical circuit shown in FIG. 4. The curve B represents the voltage $V_C$ which is $\beta$ times the above-described voltage $V_B$ and appears across the condenser 7. The curve C represents a variation in the voltage $V_G$ responsive to the speed of the wheel which appears when the hydraulic pressure control device is actuated. From the curves shown in FIG. 6, it will be understood that, when the hydraulic pressure in the brake system is increased to such an extent that the voltage $V_G$ representing the speed of the wheel becomes less than $\beta$ times the voltage $V_B$ representing the speed of the vehicle body, the relay contacts 16a are closed to reduce the hydraulic pressure in the brake system for thereby increasing the voltage $V_G$ represening the speed of the wheel, while when the hydraulic pressure in the brake system is reduced to such an extent that the voltage $V_G$ representing the speed of the wheel becomes more than $\beta$ times the voltage $V_B$ representing the speed of the vehicle body, the relay contacts 16 are opened to increase the hydraulic fressure in the brake system again. In this manner, the above operation is repeated until finally the vehicle is stopped.

It will be appreciated from the foregoing description that the anti-skid apparatus for an automotive vehicle according to the present invention is operative to detect the wheel slip ratio $\sigma$ on the basis of the formula $\beta=1-\sigma$ and can thereby control the hydraulic pressure in the brake system, by virtue of the fact that the antiskid apparatus includes therein a wheel slip ratio detecting device which comprises a relay having a set of relay contacts which is operable in an interlocked relation with the actuation of the brake pedal, means for deriving a voltage $V_C$ which is $\beta$ times a voltage $V_B$ representing the speed of the vehicle body, means for deriving a voltage $V_G$ representing the speed of the wheel, means operative in response to the actuation of the relay contacts due to the impartation of a brake force to the vehicle to thereby connect said means for deriving the voltage $V_G$ in series with said means for deriving the voltage $V_C$ in a polarity opposite to the polarity of the latter, definite voltage level detecting means connected across the output terminals of the circuit including therein both said voltage deriving means for detecting the magnitude of the difference between the voltage $V_C$ and the voltage $V_G$, and means connected with said definite voltage level detecting means so as to control the hydraulic pressure in the brake system depending on the output of said definite voltage level detecting means.

Figure 7:
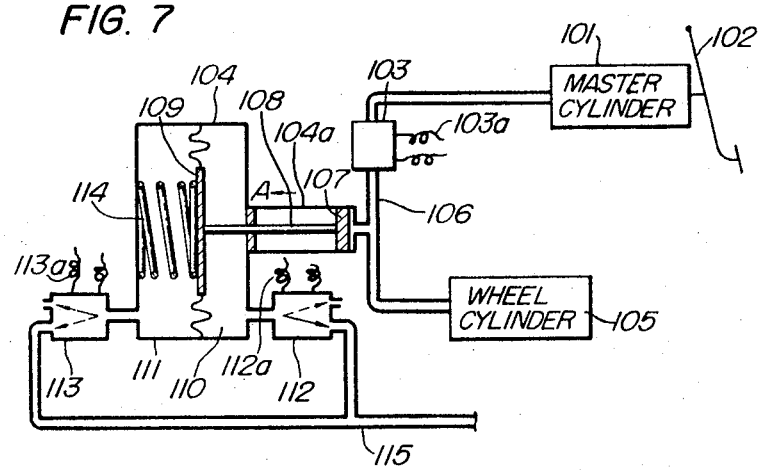
FIG. 7 is a diagrammatic view showing the structure of another embodiment of the antiskid apparatus according to the present invention equipped with a brake force control device.

Another embodiment of the antiskid apparatus according to the present invention will be described with reference to FIGS. 7 to 9. Referring to FIGS. 7 and 8, a master cylinder 101 in the brake system in an automotive vehicle is connected with a brake pedal 102 so as to control the hydraulic pressure in the brake system. The antiskid apparatus comprises a solenoid-operated shutoff valve 103 which is disposed in a hydraulic fluid conduit 106 connecting the master cylinder 101 with a brake force controller 104 and a wheel cylinder 104 and a wheel cylinder 105 and acts to shut off the hydraulic fluid supply to the brake force controller 104 and the wheel cylinder 105 when the brake force is relieved during the antiskid operation. The brake force controller 104 is equipped with a hydraulic cylinder 104a in which a piston 107 is slidably received so as to cause a variation in the hydraulic pressure in the wheel cylinder 105. A connecting rod 108 mechanically connects the piston 107 with a diaphragm 109 disposed in the brake force controller 104 and acts to transmit a force exerted on the diaphragm 109 to the piston 107. The diaphragm 109 divides the interior of the brake force controller 104 into two air chambers 110 and 111 with which respective solenoid-operated changeover valves 112 and 113 are connected so that a negative pressure developed by the inhalation of air into the engine and the atmospheric pressure can be selectively introduced into these air chambers 110 and 111. A coil spring 114 is disposed in the air chamber 111 for normally urging the diaphragm 109 toward the air chamber 110. For example, the coil spring 114 is so designed as to urge the diaphragm 109 to thereby normally set the hydraulic pressure in the wheel cylinder 105 at 20 kilograms per square centimeter. The solenoid-operated changeover valve 112 is operative in such a way as to establish the communication between the air chamber 110 and a negative pressure detecting section for the engine (not shown) in the deenergized state of a solenoid 112a while interrupting the communication between the air chamber 110 and the atmosphere, and to interrupt the communication between the air chamber 110 and the negative pressure detecting section for the engine in the energized state of the solenoid 112a while establishing the communication between the air chamber 110 and the atmosphere. On the other hand, the solenoid-operated changeover valve 113 is operative in such a manner as to interrupt the communication between the air chamber 111 and the negative pressure detecting section for the engine in the deenergized state of a solenoid 113a while establishing the communication between the air chamber 111 and the atmosphere, and to establish the communication between the air chamber 111 and the negative pressure detecting section for the engine in the energized state of the solenoid 113a while interrupting the communication between the air chamber 111 and the atmosphere. A negative pressure supply conduit 115 is provided to connect the engine negative pressure detecting section with the air chambers 110 and 111.

In FIG. 8, there is shown an electrical circuit of the electrical control section for the brake force controller 104 shown in FIG. 7. In the circuit, there is a vehicle body speed detector 116 which is so designed as to detect a voltage $V_C$ representing such a speed of the vehicle body which is $\beta$ times (where $0<\beta<1$) a voltage $V_B$ representatiing the actual speed of the vehicle body. Such a voltage $V_C$ may, for example, be obtained by dividing the output of a vehicle body speed detecting device as shown in FIG. 1. There is also provided a wheel speed detector 117 which may be an electric generator connected to one of the wheels of the vehicle. It will be apparent that the voltage $V_C$ representing the speed of the vehicle body detected by the vehicle body speed detector 116 during the normal running state of the vehicle is $\beta$ times a voltage $V_G$ representing the speed of the wheel detected by the wheel speed detector 117. The wheel speed detector 117 is connected in series with the vehicle body speed detector 116 in such a manner that their output voltage have polarities opposite to each other. A transistor circuit 118, which may, for example, be a Schmitt circuit is connected to the detectors 116 and 117 in order to discriminate the positive value or the negative value of the difference between the voltage $V_C$ representing the speed of the vehicle body and the voltage $V_G$ representing the speed of the wheel. The transistor circuit 118 energizes a relay coil 119a of a relay 119 when the voltage $V_G$ representing the speed of the wheel becomes lower than the voltage $V_C$ representing the speed of the vehicle body, and deenergizes the relay coil 119a of the relay 119 when the voltage $V_G$ becomes higher than the voltage $V_B$. A solenoid 103a of the solenoid-operated shutoff valve 103 and the solenoid 112a of the solenoid-operated changeover valve 112 are connected in series with relay contacts 119b of the relay 119. In the circuit, there is a vehicle body deceleration detector 120 which may, for example, be a differential transformer of the structure having a ferrite rod whose position is variable depending on the movement of an associated weight. A condenser 121 and a relay 122 having a relay coil 122a and normally closed relay contacts 122b are connected with the vehicle body deceleration detector 120. The relay 122 is arranged for operation in an interlocked relation with the brake pedal 102 so that the actuation of the brake pedal 102 energizes the relay coil 122a to thereby urge the relay contacts 122b to open. A transistor circuit 123 associated with the detector 120 has a high input impedance so as to prevent the charge stored in the condenser 121 from discharging at the time of the impartation of the brake force to the vehicle, and is operative to urge relay contacts 124b of a relay 124 to open by deenergizing a relay coil 124a when the deceleration of the wheel developed during the braking operation exceeds a definite value, say, 0.4 $g$ ($g$ being the acceleration of gravity). The solenoid 113a of the solenoid-operated changeover valve 113 is connected in series with the relay contacts 124b of the relay 124.

The antiskid apparatus having a structure as described above operates in the manner described below. When the brake pedal 102 is actuated to impart a brake force to the running vehicle, the relay contacts 122b of the relay 122 are urged to open so that the condenser 121 is now connected in series with the vehicle body deceleration detector 120 from the previous parallel connection therewith. Accordingly, at such a moment, the output voltage of the electrical circuit consisting of the vehicle body deceleration detector 120 and the condenser 121, that is, the voltage appearing across the input terminals $a$ and $b$ of the transistor circuit 123 becomes necessarily zero, and thereafter a voltage representing the deceleration of the vehicle body is supplied from the vehicle body deceleration detector 120 to appear across the input terminals $a$ and $b$ of the transistor circuit 123. On the other hand, the output of the transistor circuit 118 holds the relay contacts 119b of the relay 119 in the open state and thus the respective solenoids 112a and 113a of the solenoid-operated changeover valves 112 and 113 associated with the brake force controller 104 are in their deenergized state. Under such a state, the negative pressure appears in the air chamber 110 and the atmospheric pressure appears in the air chamber 111, with the result that the piston 107 is urged to the right-hand extremity of the cylinder 104a by the diaphragm 109 as shown in FIG. 7. When the hydraulic pressure in the wheel cylinder 105 increases to reduce the voltage $V_G$ representing the speed of the wheel to such an extent that the voltage $V_G$ becomes lower than the voltage $V_C$ representing the speed of the vehicle body which is $\beta$ times the voltage $V_B$ representing the actual speed of the vehicle body, the transistor circiut 118 energizes the relay coil 119a to thereby close the relay contacts 119b of the relay 119. By the closure of the relay contacts 119b, the respective solenoids 103a and 112a of the solenoid-operated shutoff valve 103 and the solenoid-operated changeover valve 112 are energized, with the result that the solenoid-operated shutoff valve 103 shuts off the hydraulic fluid supply through the hydraulic fluid supply conduit 106 extending from the master cylinder 101 to the brake force controller 104 and the wheel cylinder 105, and at the same time, the solenoid-operated changeover valve 112 interrupts the communication between the air chamber 110 and the engine negative pressure detecting section and now establishes the communication between the air chamber 110 and the atmosphere.

In the meantime, the solenoid 113a of the solenoid-operated changeover valve 113 is controlled by the transistor circuit 123 and the relay 124 in such a way that it is deenergized when the deceleration of the vehicle body produced by the impartation of the brake action exceeds a predetermined setting of, say, 0.4 $g$ and is energized when the deceleration is less than 0.4 $g$. Accordingly, suppose now that the deceleration of the vehicle body at a time when the voltage $V_G$ representing the speed of the wheel has been reduced to a value less than the voltage $V_B$ representing the speed of the vehicle body is more than 0.4 $g$, then the solenoid 113a of the solenoid-operated changeover valve 113 remains in its deenergized state. Due to the deenergized state of the solenoid 113a, the atmospheric pressure appears in both the air chambers 110 and 111, and the hydraulic pressure in the wheel cylinder 105 is reduced to a predetermined value of, say, 20 kilograms per square centimeter which is primarily determined by the force of the coil spring 114. In this connection, the strength of the coil spring 114 is so set that, within a range of the vehicle body deceleration from 1 $g$ to 0.4 $g$, a hydraulic pressure of such an extent as will not lock the wheel can be supplied to the wheel cylinder 105. Because of such a setting in the strength of the spring 114, the brake force is relieved and the speed of the wheel starts to increase again. However, the rate of increase in the speed of the wheel is gradual in this case since the predetermined brake force is still imparted to the wheel by the spring 114. Then when the voltage $V_G$ representing the speed of the wheel becomes higher than the votlage $V_C$ representing the speed of the vehicle body, the relay coil 119a of the relay 119 is deenergized by the transistor circuit 118 so that the opening of the relay contacts 119b urges both the solenoid-operated changeover valves 112 and 113 to their deenergized state. As a result, the negative pressure appears in the air chamber 110 and the atmospheric pressure appears in the air chamber 111, so that the hydraulic pressure in the wheel cylinder 105 increases again to reduce the voltage $V_G$ representing the speed of the wheel again. Thereafter the above operation is repeated until finally the vehicle body is stopped.

Next, consider a case in which the vehicle runs on a slippery road surface and the deceleration of the vehicle body is less than 0.4 $g$. When, in such a case, the voltage $V_G$ representing the speed of the wheel becomes lower than the voltage $V_C$ representing the speed of the vehicle body, the relay coil 119a of the relay 119 is energized by the transistor circuit 118 to close the relay contacts 119b, with the result that the respective solenoids 103a, 112a and 113a of the solenoid-operated shutoff valve 103 and the solenoid-operated changeover valves 112 and 113 are all urged to their energized state. Therefore, the hydraulic fluid supply through the hydraulic fluid supply conduit 106 extending from the master cylinder 101 to the brake force controller 104 and the wheel cylinder 105 is shut off, and at the same time, the atmospheric pressure appears in the air chamber 110 and the negative pressure appears in the air chamber 111, which results in a movement of the diaphragm 109 in a direction as shown by the arrow A to compress the coil spring 114. The above movement of the diaphragm 109 causes a corresponding movement of the piston 107 in the direction of the arrow A until the piston 107 proceeds to the left-hand extremity of the cylinder 104a for thereby reducing the hydraulic pressure in the wheel cylinder 105 to zero. As the hydraulic pressure in the wheel cylinder 105 is reduced in this manner, the speed of the wheel increase gradually to an extent that the voltage $V_G$ representing the speed of the wheel exceeds the voltage $V_C$ representing the speed of the vehicle body again. Since, in such a situation, the transistor circuit 118 deenergizes the relay coil 119a of the relay 119 to thereby open the relay contacts 119b, the respective solenoids 103a, 112a and 113a of the solenoid-operated shutoff valve 103 and the solenoid-operated changeover values 112 and 113 are all urged to their deenergized state, with the result that the shutoff valve 103 opens to allow the flow of the hydraulic fluid through the hydraulic fluid supply conduit 106, and at the same time, the negative pressure appears in the air chamber 110 and the atmospheric pressure appears in the air chamber 111 for thereby allowing an increase in the hydraulic pressure in the wheel cylinder 105. When the increase in the hydraulic pressure in the wheel cylinder 105 reduces the speed of the wheel to such an extent that the voltage $V_G$ representing the speed of the wheel becomes lower than the voltage $V_C$ representing the speed of the vehicle body, the shutoff valve 103 shuts off the hydraulic fluid supply through the hydraulic fluid supply conduit 106, and at the same time, the atmospheric pressure appears in the air chamber 110 and the negative pressure appears in the air chamber 111 so that the hydraulic pressure in the wheel cylinder 105 is reduced to zero again. Thereafter, the above operation is repeated to control the drive of the vehicle running on the slippery road surface.

FIG. 9 shows graphically the antiskid operation when a vehicle is controlled by the antiskid apparatus according to the present invention. The ordinate in each of FIGS. 9A, 9B and 9C represents the braking time T, while the abscissas in FIGS. 9A, 9B and 9C represent the speed responsive voltage V, the hydraulic pressure P in the wheel cylinder 105, and the vehicle body deceleration $a$, respectively. A line S in FIG. 9B represents a predetermined hydraulic pressure which is determined by the force of the coil spring 114. In FIG. 9, the solid curves indicate the antiskid operation on a hardly slippery road surface, while the broken curves indicate the antiskid operation on a slippery road surface. It will be seen from FIG. 9 that, on a hardly slippery road surface, an appreciably large variation does not take place in the vehicle body deceleration $a$ and the brakage is effected with a substantially constant deceleration because the hydraulic pressure P is always imparted to the wheel cylinder 105 in spite of the fact that the wheels are sufficiently rotation during the braking operation. Thus, the vehicle equipped with the antiskid apparatus provides a comfortable feeling of the ride and can be stopped with a shortened braking distance compared with vehicles equipped with prior art antiskid apparatus. Further, on a slippery road surface, it will be seen that the hydraulic pressure P imparted to the wheel cylinder 105 is necessarily relieved irrespective of whatever value of the vehicle body deceleration $a$ when the voltage $V_G$ representing the speed of the wheel becomes lower than the voltage $V_C$ representing the speed of the vehicle body, and thus any tendency of the wheel to be kep in a locked state can be positively obviated. It should also be understood that, on a slippery road surface, the sense of ride will not become an appreciable problem in view of the fact that the vehicle body deceleration $a$ is so small on such a road surface.

In the foregoing, description has been given with particular reference to the antiskid operation when the apparatus of the present invention is adapted to cooperate with a hydraulic brake system, but it will be readily understood that the invention is equally effectively applicable to brake systems employing compressed air or vacuum for the brake operation.

It will be appreciated from the foregoing description that the antiskid apparatus for an automotive vehicle according to the present invention exhibits such a marked effect that, on a hardly slippery road surface accompanied by a large deceleration of the vehicle body, the brake force is not rendered zero but a predetermined brake force of such an extent as will not lock the wheel is left even in the relieved state of the brake force in order to minimize the variation in the vehicle body deceleration. Such a marked effect can be obtained by virtue of the fact that the antiskid apparatus comprises brake force control means which controls the brake force in three stages, that is, a high brake force stage, a medium brake force stage and a low brake force stage, and which is operable in such a manner that a transition from the high brake force stage to the medium brake force stage takes place when the deceleration of the vhicle body exceeds a predetermined setting and a voltage $V_G$ representing the speed of the wheel is higher than a voltage $V_C$ representing such a speed of the vehicle body which is $\beta$ times a voltage $V_B$ representing the actual speed of the vehicle body, while a transistion from the medium brake force stage to the high brake force stage takes place when the vehicle body deceleration exceeds the above setting and the voltage $V_G$ is lower than the voltage $V_C$. It is therefore possible to shorten the braking distance to stop the vehicle and to give a comfortable feeling of ride during the braking operation. The manner of operation on a hardly slippery road surface in which the brake force is not rendered zero but a predetermined brake force of such an extent as will not lock the wheel is left even in the relieved state of the brake force is effective to retard the rate of variation in the rotation of the wheel during the antiskid operation. Therefore, another notable effect derivable from the invention is that the brake force control means need not have an excessively high speed of response and can be sufficiently actuated by a power source of a small capacity such as the negative pressure of the engine or the battery mounted on the vehicle to satisfactorily control the antiskid operation. Further, in the invention, a transition from the high brake force stage to the low brake force stage takes place when the vehicle body deceleration is less than the predetermined setting and the voltage $V_G$ representing the speed of the wheel is higher than the voltage $V_C$ representing the speed of the vehicle body, and a transistion from the low brake force stage to the high brake force stage takes place when the vehicle body deceleration is less than the predetermined setting and the voltage $V_G$ is lower than the voltage $V_C$. Accordingly, on a road surface such as a frozen road surface where a small vehicle body deceleration can only be developed, the brake force is substantially reduced to zero and is positively relieved when the voltage $V_G$ representing the speed of the wheel becomes lower than the voltage $V_C$ representing the speed of the vehicle body. The present invention therefore provides another excellent effect that the wheels are not continuously kept in a locked state and the antiskid operation can be satisfactorily carried out even on a frozen road surface.

We claim:

1. An antiskid apparatus for an automotive vehicle comprising a device for detecting the speed of the vehicle body and a device for detecting the slip ratio of the wheel, in which said device for detecting the speed of the vehicle body comprises a vehicle body deceleration detector, a relay having a set of relay contacts which is operable in an interlocked relation with the actuation of the brake pedal, a first condenser connected in series with the output side of said vehicle body deceleration detector, an integrator formed by the combination of a second condenser and an active element whose output current is dependent solely on an input current or input voltage and is quite independent of an output voltage, an impedance transformer for controlling the input to said integrator supplied from said vehicle body deceleration detector through said first condenser, a speed responsive generator for charging said second condenser in said integrator with a voltage representing the speed of the wheel developed immediately before the impartation of a brake force to the vehicle, and a second set of relay contacts in said relay which is also operative in an interlocked relation with the actuation of the brake pedal so as to disconnect said second condenser from said speed responsive generator in response to the starting of the brake action by the actuation of the brake pedal, whereby the speed of the wheel developed immediately before the impartation of the brake action can be stored in said second condenser as the speed of the vehicle body.

2. An antiskid apparatus for an automotive vehicle according to claim 1, in which said device for detecting the slip ratio of the wheel comprises a relay having a set of relay contacts, which is operable in an interlocked relation with the actuation of the brake pedal, means for deriving a voltage which is $\beta$ times a voltage representing the speed of the vehicle body, means for deriving a voltage representing the speed of the wheel, means operative in response to the actuation of said relay contacts due to the impartation of a brake force to the vehicle to thereby connect said second-mentioned voltage deriving means in series with said first-mentioned voltage deriving means in a polarity opposite to the polarity of the latter, definite voltage level detecting means connected across the output terminals of the circuit including both said voltage deriving means for detecting the magnitude of the difference between said voltages, and means connected with said definite voltage level detecting means so as to control the hydraulic pressure in the brake system depending on the output of said definite voltage level detecting means.

References Cited

UNITED STATES PATENTS

| 3,169,595 | 2/1965 | Shepherd | 303—21 XR |
| 3,235,036 | 2/1966 | Meyer et al. | 188—181 |
| 3,362,757 | 1/1968 | Marcheron | 303—21 |

MILTON BUCHLER, Primary Examiner

JOHN J. McLAUGHLIN, Jr., Assistant Examiner

U.S. Cl. X.R.

188—181; 303—68